(12) United States Patent
Anma

(10) Patent No.: US 9,926,062 B2
(45) Date of Patent: Mar. 27, 2018

(54) JET PROPELLED WATERCRAFT

(71) Applicant: YAMAHA HATSUDOKI KABUSHIKI KAISHA, Iwata-shi, Shizuoka (JP)

(72) Inventor: Hirofumi Anma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/461,514

(22) Filed: Mar. 17, 2017

(65) Prior Publication Data
US 2017/0274972 A1  Sep. 28, 2017

(30) Foreign Application Priority Data
Mar. 23, 2016  (JP) ................. 2016-058630

(51) Int. Cl.
| | |
|---|---|
| *B63H 21/21* | (2006.01) |
| *B63B 35/73* | (2006.01) |
| *B63H 11/02* | (2006.01) |
| *B63H 21/14* | (2006.01) |
| *B63H 23/08* | (2006.01) |
| *F02D 11/02* | (2006.01) |
| *F02D 31/00* | (2006.01) |

(52) U.S. Cl.
CPC .......... *B63H 21/21* (2013.01); *B63B 35/731* (2013.01); *B63H 11/02* (2013.01); *B63H 21/14* (2013.01); *B63H 23/08* (2013.01); *F02D 11/02* (2013.01); *F02D 31/001* (2013.01); *B63B 2751/00* (2013.01); *B63B 2758/00* (2013.01); *B63H 2021/216* (2013.01); *F02D 2200/101* (2013.01); *F02D 2200/604* (2013.01)

(58) Field of Classification Search
CPC ........ B63H 21/21; B63H 11/02; B63H 21/14; B63H 23/08; B63H 2021/216; B63B 35/731; B63B 2751/00; B63B 2758/00; F02D 11/02; F02D 31/001; F02D 2200/101; F02D 2200/604
USPC .......................................... 701/21
See application file for complete search history.

(56) References Cited

U.S. PATENT DOCUMENTS

| | | |
|---|---|---|
| 2004/0266286 A1 | 12/2004 | Yoshimasa |
| 2005/0085141 A1 | 4/2005 | Motose |
| 2008/0133075 A1* | 6/2008 | St-Pierre ............... B63H 11/08 701/21 |

(Continued)

FOREIGN PATENT DOCUMENTS

| | | |
|---|---|---|
| JP | 2005-009388 A | 1/2005 |
| JP | 2005-016354 A | 1/2005 |

*Primary Examiner* — Marthe Y Marc-Coleman
(74) *Attorney, Agent, or Firm* — Keating and Bennett, LLP

(57) ABSTRACT

A jet propelled watercraft includes a reverse gate that moves to a first position and to a second position. When the reverse gate is in the first position, the reverse gate causes a vessel body to move forward. When the reverse gate is in the second position, the reverse gate causes the vessel body to decelerate or move backward. A velocity mode selector is used to select a normal mode or a velocity mode. The velocity mode has a maximum velocity different from that of the normal mode. When the reverse gate is in the second position and the velocity mode is selected, a controller is configured or programmed to set an upper limit of an engine rotation speed in the velocity mode to be different from that of the engine rotation speed in the normal mode.

10 Claims, 11 Drawing Sheets

(56) References Cited

U.S. PATENT DOCUMENTS

2010/0022145 A1* 1/2010 Dagenais ............... B63H 11/11
440/41

* cited by examiner

JET PROPELLED WATERCRAFT

CROSS REFERENCE TO RELATED APPLICATIONS

This application claims the benefit of priority to Japanese Patent Application No. 2016-058630 filed on Mar. 23, 2016. The entire contents of this application are hereby incorporated herein by reference.

BACKGROUND OF THE INVENTION

1. Field of the Invention

The present invention relates to a jet propelled watercraft.

2. Description of the Related Art

There is a well-known type of jet propelled watercraft that can set a variety of modes in accordance with cruising conditions. For example, Japan Laid-open Patent Application Publication No. 2005-9388 describes a jet propelled watercraft that enables a vessel operator to select a steering angle correspondence mode. In this steering angle correspondence mode, a driving force is reduced when the jet propelled watercraft turns during high velocity forward cruising. With this configuration, turning performance of the jet propelled watercraft can be enhanced.

On the other hand, Japan Laid-open Patent Application Publication No. 2005-16354 describes a jet propelled watercraft in which a predetermined upper limit is set for a throttle opening degree so as to reduce an engine output more during backward movement than during forward movement. With this setting, the engine output is limited during backward movement, and high velocity cruising can be prevented during backward movement.

The jet propelled watercraft described in Japan Laid-open Patent Application Publication No. 2005-16354 can select either a medium velocity cruising mode or a low velocity cruising mode as an engine output characteristic. However, the upper limit of the throttle opening degree during backward movement is fixed to the same value in both the medium velocity cruising mode and the low velocity cruising mode.

In the jet propelled watercraft, either a deceleration force or the vessel velocity during backward movement is regulated by regulating a backward thrust in response to operating an accelerator lever. However, a vessel operator such as a novice operator, who is not familiar with operating the vessel, is likely to fully squeeze the accelerator lever during deceleration. Therefore, when the upper limit of the throttle opening degree during backward movement is fixed as described above, it is not easy to regulate the backward thrust at an intended magnitude in accordance with vessel body conditions. Hence, when the vessel velocity is reduced as with the steering angle correspondence mode described in Japan Laid-open Patent Application Publication No. 2005-9388, there is too much deceleration and the behavior of the vessel body becomes easily unstable. As a result, there is a room for improvement in easily regulating a backward thrust in accordance with the vessel body conditions such as the vessel velocity during forward movement.

SUMMARY OF THE INVENTION

Preferred embodiments of the present invention provide a jet propelled watercraft that is able to easily regulate a backward thrust in accordance with vessel body conditions.

A jet propelled watercraft according to a preferred embodiment of the present invention includes a vessel body, an engine, a jet propulsion mechanism, a reverse gate, a velocity mode selector, and a controller. The engine is accommodated in the vessel body. The jet propulsion mechanism generates a thrust due to a driving force from the engine. The reverse gate moves to a first position and to a second position. The reverse gate causes the vessel body to move forward when in the first position. The reverse gate causes the vessel body to decelerate or move backward when in the second position. The velocity mode selector is able to select a normal mode or a velocity mode. The velocity mode is set to have a maximum velocity different from a maximum velocity of the normal mode. When the reverse gate is in the second position and the velocity mode is selected, the controller is configured or programmed to set an upper limit of an engine rotation speed in the velocity mode to be different from an upper limit of the engine rotation speed in the normal mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
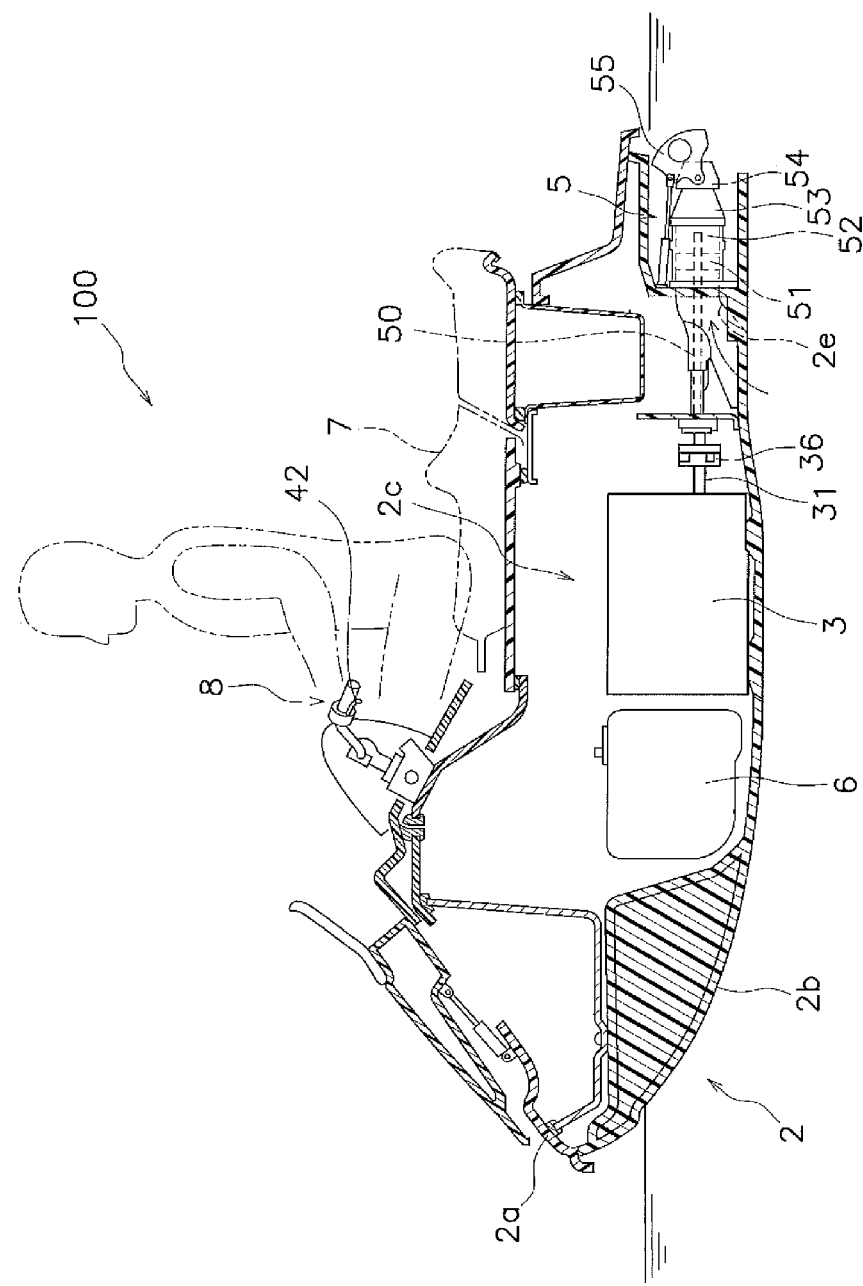
FIG. 1 is a cross-sectional view of a schematic construction of a jet propelled watercraft according to a preferred embodiment of the present invention.
Figure 2:
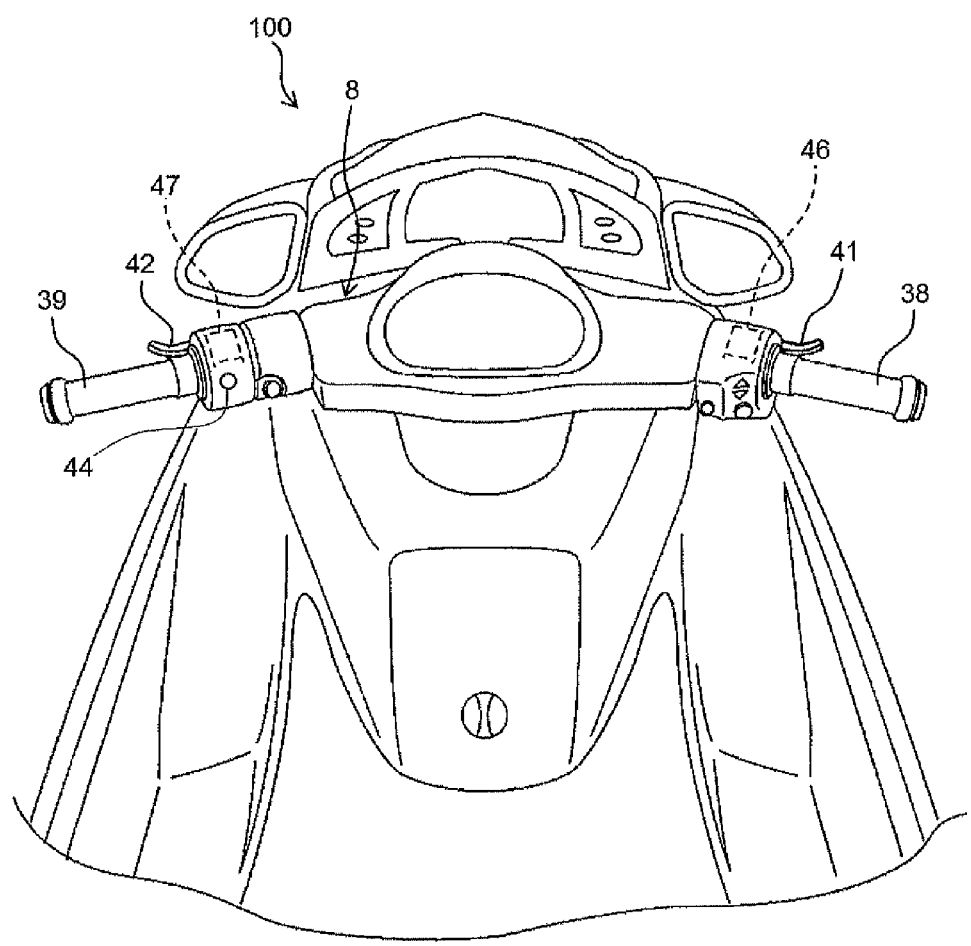
FIG. 2 is a perspective view of a construction of a steering handle and its vicinity in the jet propelled watercraft.
Figure 3:
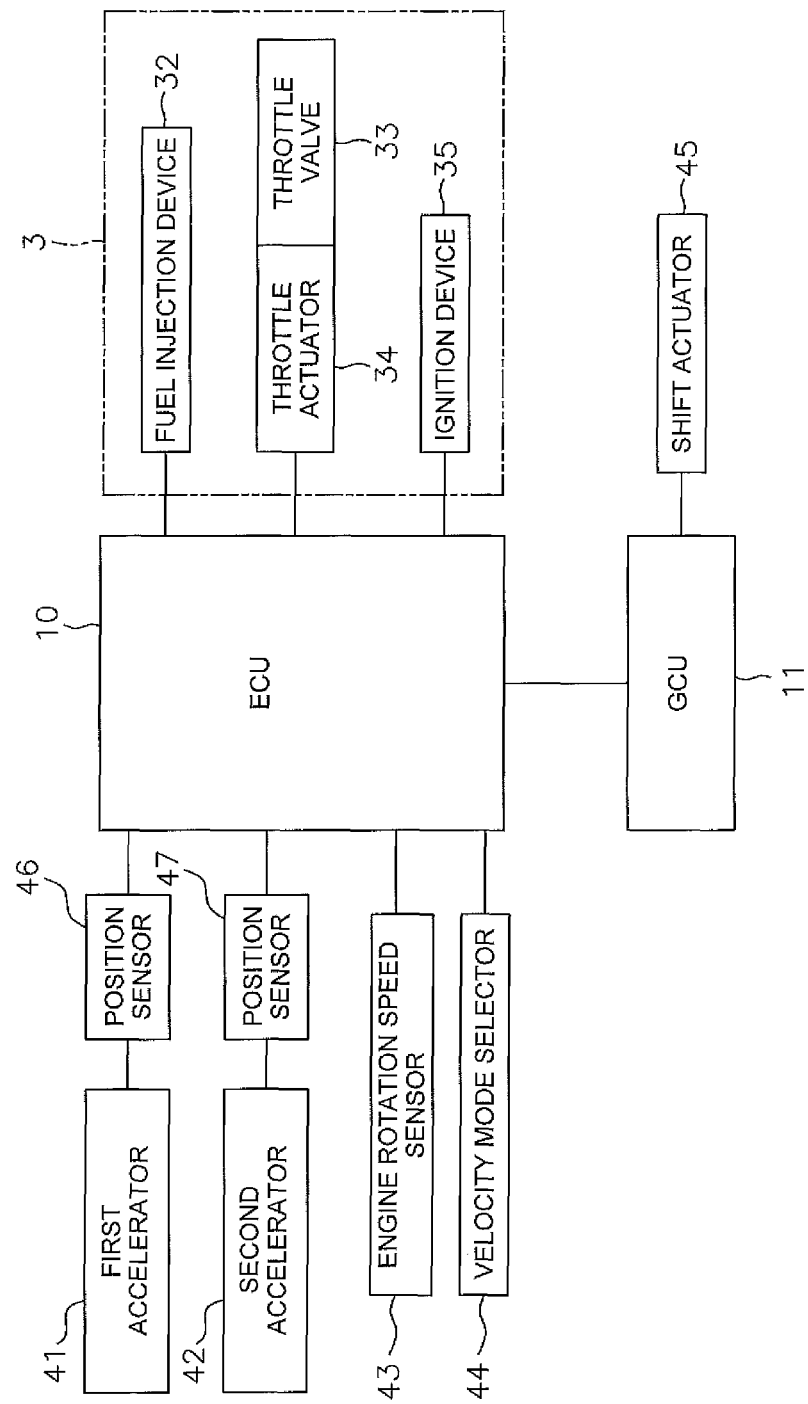
FIG. 3 is a block diagram showing a control system of the jet propelled watercraft.
Figure 4:
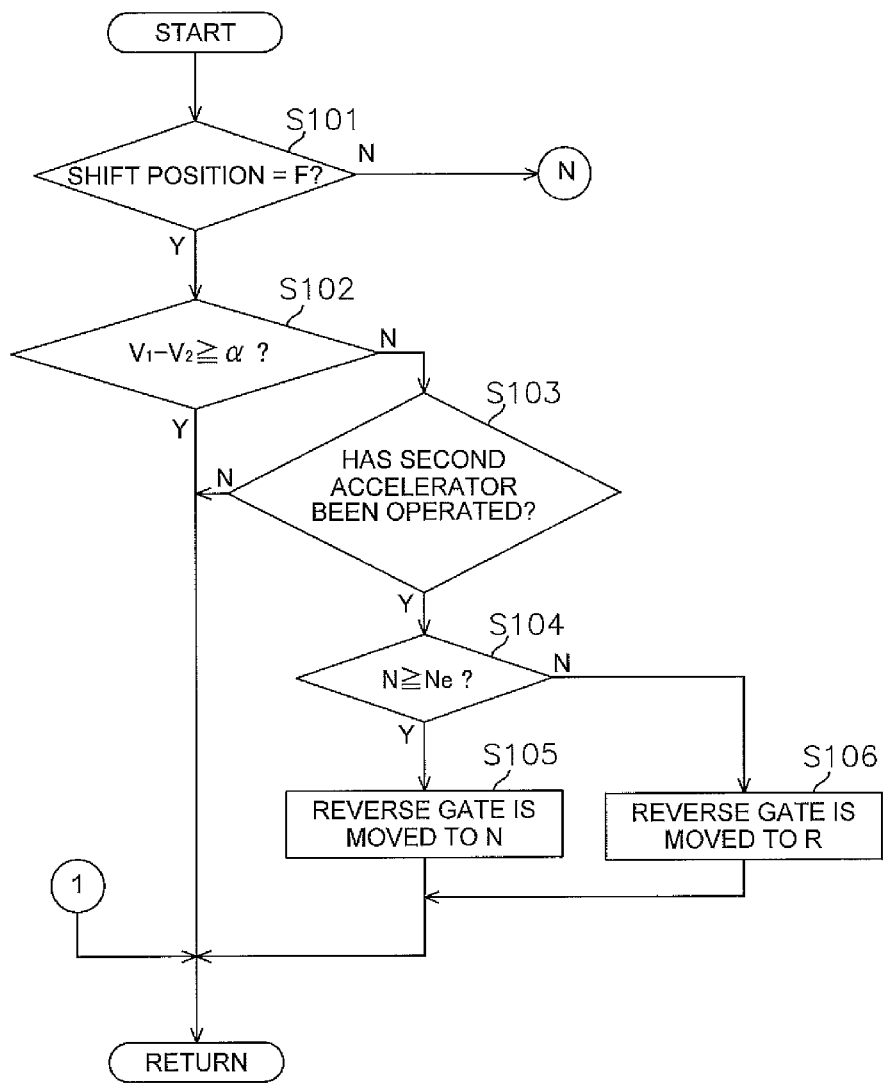
FIG. 4 is a flowchart showing a portion of the process steps of a deceleration control.

A jet propelled watercraft according to preferred embodiments of the present invention will be hereinafter explained with reference to the attached drawings. FIG. 1 is a cross-sectional view of a schematic construction of a jet propelled watercraft 100. FIG. 2 is a perspective view of a construction of a steering handle 8 and its vicinity in the jet propelled watercraft 100. FIG. 3 is a block diagram showing a control system of the jet propelled watercraft 100. The jet propelled watercraft 100 is, for example, a so-called personal watercraft (PWC).

As shown in FIG. 1, the jet propelled watercraft 100 includes a vessel body 2, an engine 3, and a jet propulsion mechanism 5. The vessel body 2 includes a deck 2a and a hull 2b. The vessel body 2 includes an engine compartment 2c in its interior. The engine compartment 2c accommodates the engine 3, a fuel tank 6 and so forth. A seat 7 is attached to the deck 2a. The seat 7 is disposed above the engine 3. The steering handle 8 is disposed forward of the seat 7 in order to steer the vessel body 2.

As shown in FIG. 2, the steering handle 8 includes a right grip 38 and a left grip 39, both of which are held by an operator during steering. A first accelerator 41 is turnably mounted to the right grip 38. The first accelerator 41 is mainly operated to forwardly move the jet propelled watercraft 100. In the present preferred embodiment, the first accelerator 41 is, for example, a lever. A position sensor 46 is connected to the first accelerator 41. The position sensor 46 outputs a signal, indicating the operating amount of the first accelerator 41 (hereinafter referred to as "first accelerator operating amount"), to an ECU 10 shown in FIG. 3.

On the other hand, a second accelerator 42 is turnably mounted to the left grip 39. The second accelerator 42 is mainly operated to backwardly move the jet propelled watercraft 100 or decrease the forward velocity of the jet propelled watercraft 100. In the present preferred embodiment, the second accelerator 42 is, for example, a lever. A position sensor 47 is connected to the second accelerator 42. The position sensor 47 outputs a signal, indicating the operating amount of the second accelerator 42 (hereinafter referred to as "second accelerator operating amount"), to the ECU 10.

The steering handle 8 is also provided with a velocity mode selector 44. The velocity mode selector 44 is disposed, for example, in the vicinity of the left grip 39. The velocity mode selector 44 is preferably disposed in the vicinity of the second accelerator 42. The velocity mode selector 44 outputs a signal, indicating an operation of the velocity mode selector 44, to the ECU 10.

The velocity mode selector 44 may be disposed in the vicinity of the right grip 38. Alternatively, the velocity mode selector 44 may be disposed in a position other than the vicinities of the right and left grips 38 and 30.

A vessel operator is able to select either a normal mode or a velocity mode as a control mode of the engine 3 by operating the velocity mode selector 44. The maximum velocity, set for the velocity mode, is different from that set for the normal mode. In the present preferred embodiment, the velocity mode includes a first velocity mode and a second velocity mode. In the present preferred embodiment, the first velocity mode is a low fuel consumption mode. On the other hand, the second velocity mode is a rapid acceleration mode.

The velocity mode selector 44 is, for instance, a switch. Every time the velocity mode selector 44 is operated, the normal mode, the low fuel consumption mode, and the rapid acceleration mode are sequentially switched as the control mode of the engine 3. It should be noted that the structure of the velocity mode selector 44 may be changed. For example, a plurality of switches may be provided in association with the modes, respectively. Alternatively, a switch including a dial, a slide or so forth may be provided as long as its position is switchable among a plurality of positions associated with the modes, respectively. Alternatively, the velocity mode selector 44 may be an input device including, for example, a touch panel.

As shown in FIG. 1, the engine 3 includes a crankshaft 31. The crankshaft 31 extends in a back-and-forth direction. As shown in FIG. 3, the engine 3 includes fuel injection devices 32, a throttle valve 33, a throttle actuator 34, and ignition devices 35. Each fuel injection device 32 injects fuel to be supplied to a combustion chamber of the engine 3. The amount of the mixed gas to be fed to the combustion chamber is regulated by changing the opening degree of the throttle valve 33 (hereinafter referred to as "throttle opening degree"). The throttle valve 33 is provided commonly for a plurality of cylinders of the engine 3.

Alternatively, a plurality of throttle valves 33 may be provided for the cylinders of the engine 3, respectively. The throttle actuator 34 changes the throttle opening degree. Each ignition device 35 ignites the fuel inside the combustion chamber. It should be noted that each of the cylinders of the engine 3 is provided with the fuel injection device 32 and the ignition device 35.

The jet propulsion mechanism 5 generates a thrust to propel the vessel body 2 due to the driving force from the engine 3. The jet propulsion mechanism 5 sucks in and ejects water in the surroundings of the vessel body 2. As shown in FIG. 1, the jet propulsion mechanism 5 includes an impeller shaft 50, an impeller 51, an impeller housing 52, a nozzle 53, a deflector 54, and a reverse gate 55. The impeller shaft 50 extends backwardly from the engine compartment 2c. The front portion of the impeller shaft 50 is coupled to the crankshaft 31 through a coupling 36. The rear portion of the impeller shaft 50 extends into the impeller housing 52 through a water suction portion 2e of the vessel body 2. The impeller housing 52 is connected to the rear portion of the water suction portion 2e. The nozzle 53 is disposed rearward of the impeller housing 52. The impeller 51 is attached to the rear portion of the impeller shaft 50. The impeller 51 is disposed in the interior of the impeller housing 52. The impeller 51 rotates together with the impeller shaft 50 in order to cause the water suction portion 2e to draw in water. The impeller 51 rearwardly ejects the water through the nozzle 53. The deflector 54 is disposed rearward of the nozzle 53. The deflector 54 switches the direction of water ejected through the nozzle 53 to the starboard or port side.

The reverse gate 55 is disposed rearward of the deflector 54. The reverse gate 55 switches the direction of water ejected through the nozzle 53 and the deflector 54 to the forward direction. Specifically, the reverse gate 55 is disposed to be movable to a forward moving position, a backward moving position, and a neutral position. When in the forward moving position, the reverse gate 55 does not change the direction of the stream of water ejected from the jet propulsion mechanism 5. Therefore, when in the forward moving position, the reverse gate 55 forwardly moves the vessel body 2.

When in the backward moving position, the reverse gate 55 changes the direction of the stream of water ejected from the jet propulsion mechanism 5 to the forward side of the vessel body 2. Therefore, when in the backward moving position, the reverse gate 55 backwardly moves the vessel body 2. Alternatively, when in the backward moving position, the reverse gate 55 reduces the thrust during forward movement of the vessel body 2. The vessel body 2 is thus decelerated.

The neutral position is a position located between the forward moving position and the backward moving position. When in the neutral position, the reverse gate 55 changes the direction of the stream of water ejected from the jet propulsion mechanism 5 to the starboard and port sides of the vessel body 2. Therefore, when in the neutral position, the reverse gate 55 reduces the thrust during forward movement of the vessel body 2. The vessel body 2 is thus decelerated.

The forward moving position corresponds to a first position to forwardly move the vessel body. The backward moving position and the neutral position correspond to a second position to decelerate or backwardly move the vessel body.

As shown in FIG. 3, the jet propelled watercraft 100 includes an engine rotation speed sensor 43 and the ECU (Engine Control Unit) 10. The engine rotation speed sensor 43 detects the rotation speed of the engine 3. The engine rotation speed sensor 43 inputs a speed signal indicating the rotation speed of the engine 3 to the ECU 10.

The ECU 10 is configured or programmed to control the engine 3. In other words, the ECU 10 is configured or programmed to transmit command signals to the fuel injection devices 32, the throttle actuator 34, and the ignition devices 35, respectively, so as to electrically control these devices. The ECU 10 is configured or programmed to control the fuel injection devices 32 so as to control the amount of fuel to be supplied to the combustion chamber of the engine 3. The ECU 10 is configured or programmed to drive the throttle actuator 34 so as to control the throttle opening degree. The ECU 10 is configured or programmed to control the rotation speed of the engine 3 by at least one of a throttle valve opening degree, a fuel injection amount, and an ignition timing.

As shown in FIG. 3, the jet propelled watercraft 100 includes a shift actuator 45 and a GCU (Gate Control Unit) 11. The shift actuator 45 moves the reverse gate 55 to any one of the forward moving position, the backward moving position, and the neutral position. The shift actuator 45 is a servomotor, for instance, and is controlled by the GCU 11. The GCU 11 is configured or programmed to control the shift actuator 45 so as to change the position of the reverse gate 55 in response to an operation of the first accelerator 41 and an operation of the second accelerator 42.

The ECU 10 is configured or programmed to switch the position of the reverse gate 55 in accordance with the first accelerator operating amount and the second accelerator operating amount. Therefore, the vessel operator is able to switch the behavior of the vessel body 2 among forward movement, deceleration, and backward movement by operating the first accelerator 41 and the second accelerator 42.

A control of the engine 3 based on the first accelerator operating amount and the second accelerator operating amount will be hereinafter explained. FIGS. 4 to 9 are flowcharts showing process steps of a control to be executed by the ECU 10.

In step S101, the ECU 10 determines whether or not a shift position is a forward moving position. The shift position refers to a position of the reverse gate 55, and "F" stands for the forward moving position in the drawings. It should be noted that in the drawings, "N" stands for the neutral position, while "R" stands for the backward moving position. For example, the GCU 11 determines the shift position based on a signal from a sensor that detects the position of the reverse gate 55.

When it is determined that the shift position is the forward moving position in step S101, the process proceeds to step S102. In step S102, the ECU 10 determines whether or not a difference between a first accelerator operating amount V1 and a second accelerator operating amount V2 is greater than or equal to a predetermined value "α". It should be noted that the absolute value of "α" could be quite small. When it is determined that the difference between the first accelerator operating amount V1 and the second accelerator operating amount V2 is greater than or equal to the predetermined valve "α", the process returns to step S101 and the position of the reverse gate 55 is maintained in the forward moving position.

When the difference between the first accelerator operating amount V1 and the second accelerator operating amount V2 is less than the predetermined valve "α", the process proceeds to step S103. When the difference between the first accelerator operating amount V1 and the second accelerator operating amount V2 is less than the predetermined valve "α", this means that the vessel operator is trying to decelerate the vessel body 2. Therefore, when the difference between the first accelerator operating amount V1 and the second accelerator operating amount V2 is less than the predetermined valve "α", step S103 and its subsequent steps are performed to move the reverse gate 55 from the forward moving position to either the backward moving position or the neutral position so as to decelerate the vessel body 2.

In step 103, the ECU 10 determines whether or not the second accelerator 42 has been operated. For example, when the second accelerator operating amount V2 is greater than or equal to a predetermined value, the ECU 10 determines that the second accelerator 42 has been operated. The predetermined value is not limited to 0, and may be a value small enough to determine that the second accelerator 42 has not been operated. When it is not determined that the second accelerator 42 has been operated, the process returns to step S101. When it is determined that the second accelerator 42 has been operated, the process proceeds to step S104.

In step S104, the ECU 10 determines whether or not an engine rotation speed N is greater than or equal to a predetermined rotation speed Ne. It is preferable to use a value obtained by filtering the engine rotation speed detected by the engine rotation speed sensor 43 as the engine rotation speed N. Accordingly, the engine rotation speed corresponding to the vessel velocity may be used for this decision step. It should be noted that the engine rotation speed actually detected by the engine rotation speed sensor 43 may be used as the engine rotation speed N.

When it is determined that the engine rotation speed N is greater than or equal to the predetermined rotation speed Ne, the process proceeds to step S105. In step S105, the reverse gate 55 is moved to the neutral position. For example, the GCU 11 moves the reverse gate 55 to the neutral position when receiving, from the ECU 10, a command signal to move the reverse gate 55 to the neutral position. When the reverse gate 55 reaches the neutral position, the GCU 11 transmits a signal, indicating that the reverse gate 55 has reached the neutral position, to the ECU 10.

When it is determined in step S104 that the engine rotation speed N is less than the predetermined rotation speed Ne, the process proceeds to step S106. In step S106, the reverse gate 55 is moved to the backward moving position. For example, the GCU 11 moves the reverse gate 55 to the backward moving position when receiving, from the ECU 10, a command signal to move the reverse gate 55 to the backward moving position. When the reverse gate 55 has reached the backward moving position, the GCU 11 transmits a signal, indicating that the reverse gate 55 has reached the backward moving position, to the ECU 10.

As described above, the process step to move the reverse gate 55 to the neutral position is performed when the difference between the first accelerator operating amount V1 and the second accelerator operating amount V2 is less than the predetermined valve "α" and furthermore the vessel velocity is fast. By contrast, the process step to move the reverse gate 55 to the backward moving position is performed when the difference between the first accelerator operating amount V1 and the second accelerator operating amount V2 is less than the predetermined valve "α" and furthermore the vessel velocity has decreased sufficiently.

Figure 5:
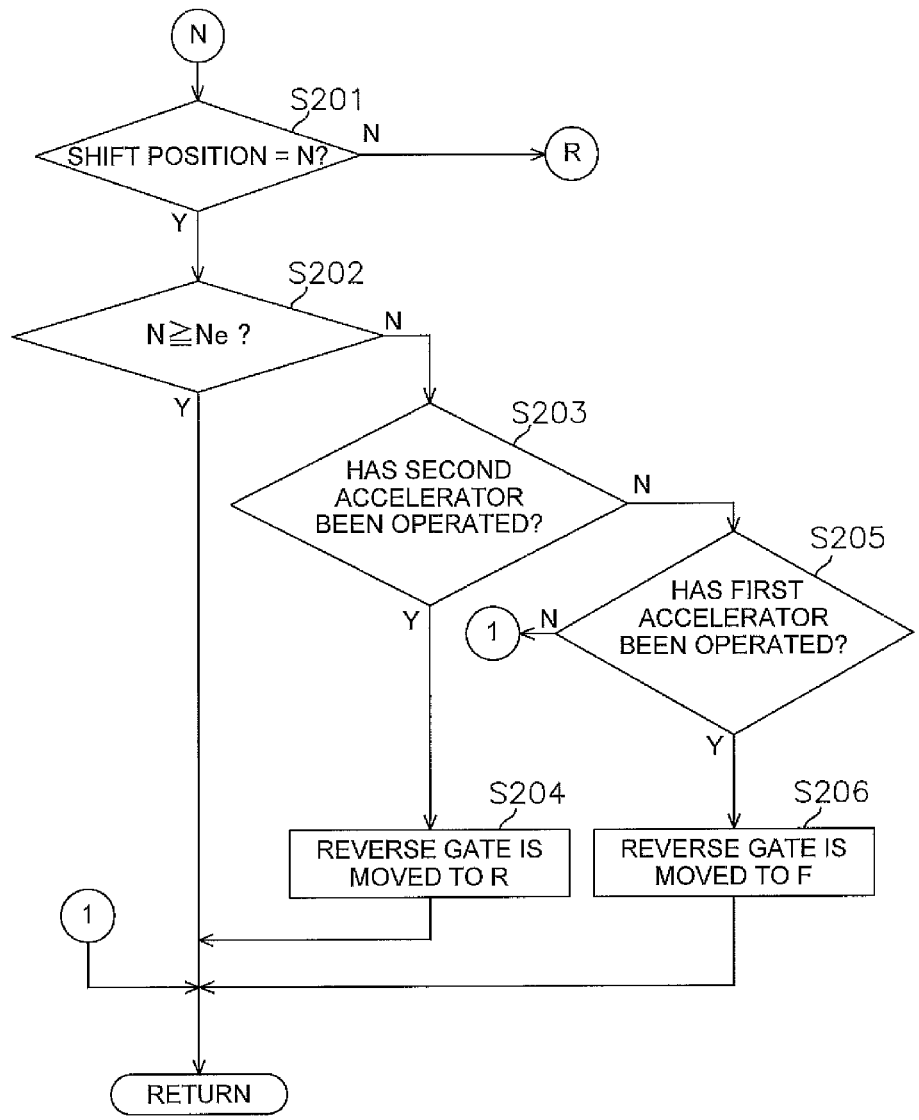
FIG. 5 is a flowchart showing a portion of the process steps of the deceleration control.

When it is determined in step S101 that the shift position is not the forward moving position, the process proceeds to step S201 shown in FIG. 5. In step S201, the ECU 10 determines whether or not the shift position is the neutral position. When the shift position is the neutral position, the process proceeds to step S202.

In step S202, similarly to step S104, the ECU 10 determines whether or not the engine rotation speed N is greater than or equal to the predetermined rotation speed Ne. When it is determined that the engine rotation speed N is greater than or equal to the predetermined rotation speed Ne, the process returns to step S101. When it is determined that the engine rotation speed N is less than the predetermined rotation speed Ne, the process proceeds to step S203.

In step S203, similarly to step S103, the ECU 10 determines whether or not the second accelerator 42 has been operated. When it is determined that the second accelerator 42 has been operated, the process proceeds to step S204.

In step S204, similarly to step S106, the GCU 11 moves the reverse gate 55 to the backward moving position. Thereafter, the process returns to step S101.

When it is determined in step S203 that the second accelerator 42 has not been operated, the process proceeds to step S205. In step S205, the ECU 10 determines whether or not the first accelerator 41 has been operated. For example, when the first accelerator operating amount V1 is greater than or equal to a predetermined value, the ECU 10 determines that the first accelerator 41 has been operated. The predetermined value is not limited to 0, and may be a value small enough to determine that the first accelerator 41 has not been operated. When it is determined that the first accelerator 41 has not been operated, the process returns to step S101. When it is determined that the first accelerator 41 has been operated, the process proceeds to step S206.

In step S206, the GCU 11 moves the reverse gate 55 to the forward moving position. For example, the GCU 11 moves the reverse gate 55 to the forward moving position when receiving, from the ECU 10, a command signal to move the reverse gate 55 to the forward moving position. When the reverse gate 55 has reached the forward moving position, the GCU 11 transmits a signal, indicating that the reverse gate 55 has reached the forward moving position, to the ECU 10.

As described above, the shift position is changed from the neutral position to the backward moving position when the following conditions are satisfied: the shift position is the neutral position; the vessel velocity has decreased sufficiently; and the second accelerator 42 has been operated. By contrast, the shift position is changed from the neutral position to the forward moving position when the following conditions are satisfied: the shift position is the neutral position; the vessel velocity has decreased sufficiently; the second accelerator 42 has not been operated; and the first accelerator 41 has been operated.

Figure 6:
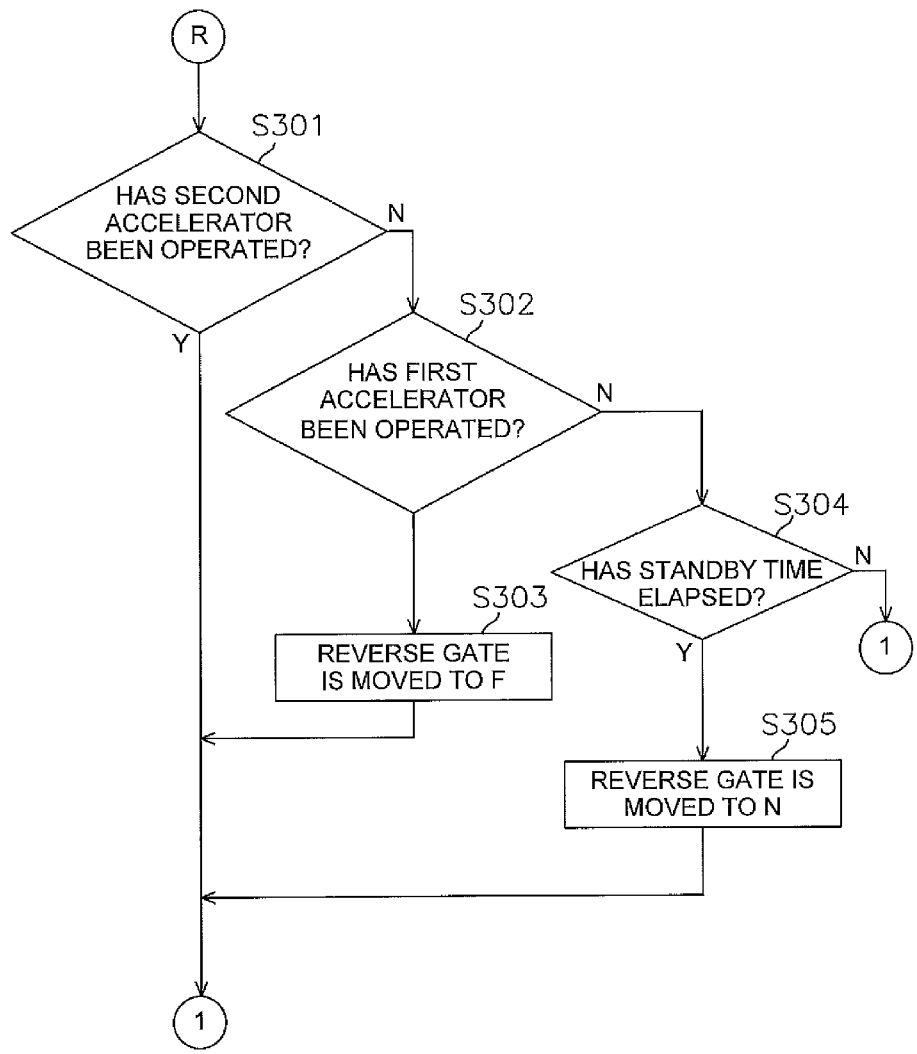
FIG. 6 is a flowchart showing a portion of the process steps of the deceleration control.

When it is determined that the shift position is not the neutral position in step S201 shown in FIG. 5, the process proceeds to step S301 shown in FIG. 6.

In step S301, similarly to step S103, the ECU 10 determines whether or not the second accelerator 42 has been operated. When it is determined that the second accelerator 42 has been operated, the process returns to step S101. When it is determined that the second accelerator 42 has not been operated, the process proceeds to step S302.

In step S302, similarly to step S205, it is determined whether or not the first accelerator 41 has been operated. When it is determined that the first accelerator 41 has been operated, the process proceeds to step S303. In step S303, similarly to step S206, the GCU 11 moves the reverse gate 55 to the forward moving position.

As described above, the ECU 10 moves the reverse gate 55 from the backward moving position to the forward moving position when the following conditions are satisfied: the reverse gate 55 is located in the backward moving position; the second accelerator 42 has not been operated; and the first accelerator 41 has been operated.

When it is determined in step S302 that the first accelerator 41 has not been operated, the process proceeds to step S304. In step S304, the ECU 10 determines whether or not a predetermined standby time has elapsed. When it is determined that the predetermined standby time has not elapsed yet, the process returns to step S101. By contrast, when it is determined that the predetermined standby time has elapsed, the process proceeds to step S305. In step S305, similarly to step S105, the GCU 11 moves the reverse gate 55 to the neutral position.

As described above, the ECU 10 moves the reverse gate 55 from the backward moving position to the neutral position when the following conditions are satisfied: the reverse gate 55 is located in the backward moving position; the predetermined standby time has elapsed while both of the first and second accelerators 41 and 41 have not been operated. In other words, the ECU 10 moves the reverse gate 55 from the backward moving position to the neutral position when the condition of the vessel body 2 remains unchanged for the standby time or greater while the first and second accelerators 41 and 42 have not been operated.

Actions to be performed by the jet propelled watercraft 100 based on the above-described deceleration control will be explained as follows.

When a vessel operator operates the second accelerator 42 such that the relationship "the first accelerator operating amount V1—the second accelerator operating amount V2≧0" is established while the jet propelled watercraft 100 forwardly moves at a fast vessel velocity, the reverse gate 55 is automatically switched from the forward moving position to the neutral position (S105). Accordingly, the jet propelled watercraft 100 decelerates. At this time, as described below, it is possible to obtain a deceleration force in accordance with the second accelerator operating amount V2.

When the vessel velocity then slows down, the reverse gate 55 is automatically switched from the neutral position to the backward moving position (S204). Accordingly, the jet propelled watercraft 100 further decelerates and subsequently moves backward. At this time, it is possible to obtain a deceleration force or a backward thrust in accordance with the second accelerator operating amount V2.

When the vessel operator operates the second accelerator 42 such that the relationship "the first accelerator operating amount V1—the second accelerator operating amount V2≧0" while the jet propelled watercraft 100 forwardly moves at a slow vessel velocity, the reverse gate 55 is automatically switched from the forward moving position to the backward moving position (S106). Accordingly, the jet propelled watercraft 100 decelerates. At this time, it is possible to obtain a deceleration force in accordance with the second accelerator operating amount V2.

When the vessel operator returns the second accelerator 42 to its initial position and operates the first accelerator 41 while the reverse gate 55 is located in either the neutral position or the backward moving position, the reverse gate 55 is switched to the forward moving position (S206, S303). In other words, when the reverse gate 55 is located in either the neutral position or the backward moving position, the reverse gate 55 is not switched into the forward moving position unless the vessel operator returns the second accelerator 42 to its initial position even if the vessel operator operates the first accelerator 41.

Next, a mode switch control to be performed for the engine 3 by the velocity mode selector 44 will be explained. In this mode switch control, the vessel operator is able to select any of the normal mode, the first velocity mode (low fuel consumption mode), and the second velocity mode (rapid acceleration mode) as the control mode of the engine 3 by operating the velocity mode selector 44. The ECU 10 is configured or programmed to switch engine output characteristics in accordance with the mode selected by the velocity mode selector 44 and the position of the reverse gate 55.

Figure 7:
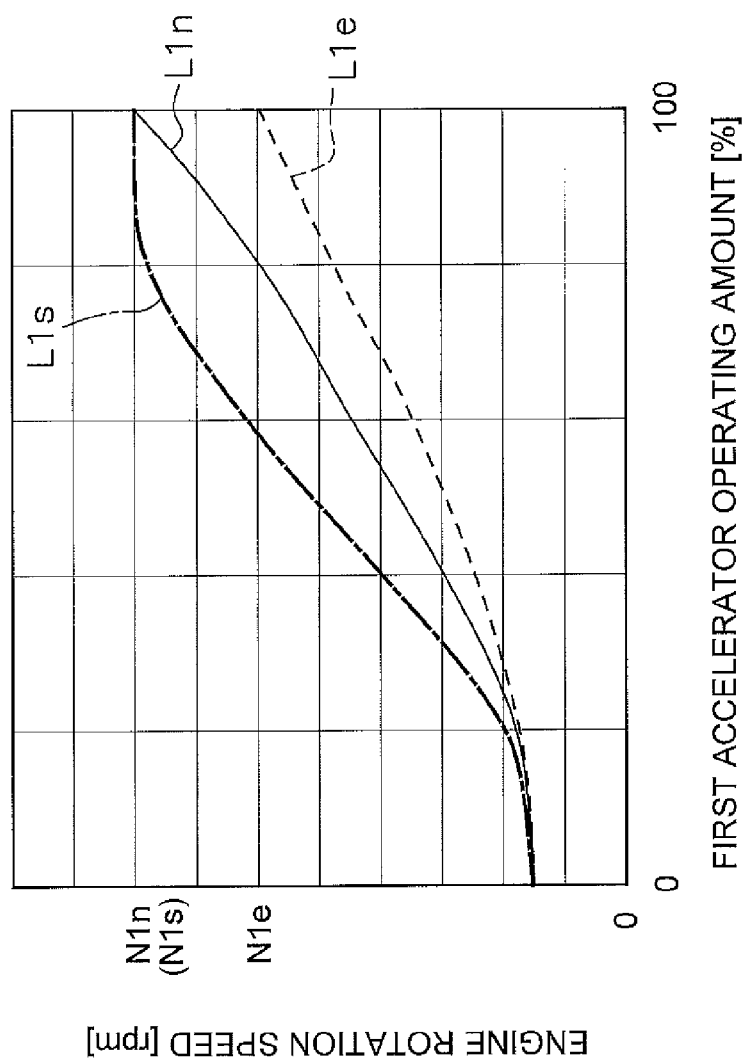
FIG. 7 is a chart showing exemplary first engine output characteristics in respective modes.

FIG. 7 is a chart showing engine output characteristics (hereinafter referred to as "first engine output characteristics") when the reverse gate 55 is located in the forward moving position. Each of the first engine output characteristics defines a relationship between the first accelerator operating amount and the engine rotation speed.

When the reverse gate 55 is located in the forward moving position and only the first accelerator 41 has been operated, the ECU 10 sets, as a target rotation speed, a value of the engine rotation speed corresponding to a value of the first accelerator operating amount based on the first engine output characteristic.

When the reverse gate 55 is located in the forward moving position and both of the first and second accelerators 41 and 42 have been operated, the ECU 10 uses a difference between the first accelerator operating amount and the second accelerator operating amount as a value of the first accelerator operating amount in FIG. 7, and sets, as a target rotation speed, a value of the engine rotation speed corresponding to the value of the first accelerator operating amount based on the first engine output characteristic. Therefore, during forward movement, the vessel operator is able to regulate the forward vessel velocity by operating the first and second accelerators 41 and 42.

It should be noted that when the reverse gate 55 is located in the forward moving position and both of the first and second accelerators 41 and 42 have been operated, a first engine rotation speed corresponding to a value of the first accelerator operating amount may be obtained based on the first engine output characteristic; a second engine rotation speed corresponding to a value of the second accelerator operating amount may be obtained based on one of second engine output characteristics (to be described); and a difference between the first engine rotation speed and the second engine rotation speed may be set as the target rotation speed.

In FIG. 7, L1$n$ indicates the first engine output characteristic for the normal mode. L1$e$ indicates the first engine output characteristic for the first velocity mode. L1$s$ indicates the first engine output characteristic for the second velocity mode.

As shown in FIG. 7, the engine rotation speed more gently increases with an increase in the first accelerator operating amount in the first engine output characteristic L1$e$ for the first velocity mode than in the first engine output characteristic L1$n$ for the normal mode.

Additionally, when the first accelerator operating amount is a maximum (100%), the engine rotation speed is lower in the first engine output characteristic L1$e$ for the first velocity mode than in the first engine output characteristic L1$n$ for the normal mode. In other words, an upper limit N1$e$ of the engine rotation speed in the first engine output characteristic L1$e$ for the first velocity mode is smaller than an upper limit N1$n$ of the engine rotation speed in the first engine output characteristic L1$n$ for the normal mode. Therefore, fuel efficiency is more enhanced in the first velocity mode than in the normal mode.

The engine rotation speed more rapidly increases with an increase in the first accelerator operating amount in the first engine output characteristic L1$s$ for the second velocity mode than in the first engine output characteristic L1$n$ for the normal mode. Therefore, better acceleration performance is obtained in the second velocity mode than in the normal mode.

It should be noted that when the first accelerator operating amount is a maximum (100%), a value of the engine rotation speed in the first engine output characteristic L1$s$ for the second velocity mode is equal or substantially equal to that of the engine rotation speed in the first engine output characteristic L1$n$ for the normal mode. In other words, an upper limit N1$s$ of the engine rotation speed in the first engine output characteristic L1$s$ for the second velocity mode is equal to the upper limit N1$n$ of the engine rotation speed in the first engine output characteristic L1$n$ for the normal mode.

Figure 8:
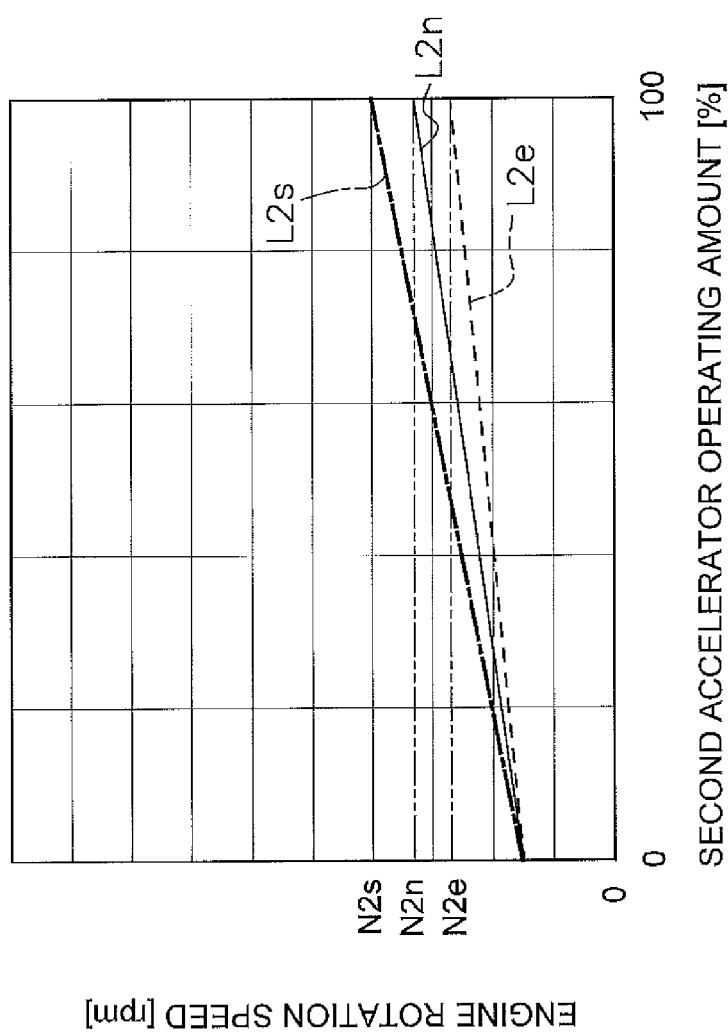
FIG. 8 is a chart showing exemplary second engine output characteristics in the respective modes.

FIG. 8 is a chart showing engine output characteristics (hereinafter referred to as "second engine output characteristics") when the reverse gate 55 is located in either the neutral position or the backward moving position. Each of the second engine output characteristics defines a relationship between the second accelerator operating amount and the engine rotation speed.

When the reverse gate 55 is located in either the neutral position or the backward moving position, the ECU 10 sets, as a target rotation speed, a value of the engine rotation speed corresponding to a value of the second accelerator operating amount based on the second engine output characteristic. Therefore, in decelerating the vessel velocity, the vessel operator is able to regulate a deceleration force by operating the second accelerator 42. On the other hand, during backward movement, the vessel operator is able to regulate the backward vessel velocity by operating the second accelerator 42.

In FIG. 8, L2$n$ indicates the second engine output characteristic for the normal mode. L2$e$ indicates the second engine output characteristic for the first velocity mode. L2$s$ indicates the second engine output characteristic for the second velocity mode.

As shown in FIG. 8, the engine rotation speed more gently increases with an increase in the second accelerator operating amount in the second engine output characteristic L2$e$ for the first velocity mode than in the second engine output characteristic L2$n$ for the normal mode.

Additionally, when the second accelerator operating amount is a maximum (100%), the engine rotation speed is lower in the second engine output characteristic L2$e$ for the first velocity mode than in the second engine output characteristic L2$n$ for the normal mode. In other words, an upper limit N2$e$ of the engine rotation speed in the second engine output characteristic L2$e$ for the first velocity mode is smaller than an upper limit N2$n$ of the engine rotation speed in the second engine output characteristic L2$n$ for the normal mode. Therefore, fuel efficiency is more enhanced in the first velocity mode than in the normal mode.

The engine rotation speed rapidly increases with an increase in the second accelerator operating amount in the second engine output characteristic L2$s$ for the second velocity mode than in the second engine output characteristic L2$n$ for the normal mode.

Additionally, when the second accelerator operating amount is a maximum (100%), the engine rotation speed is higher in the second engine output characteristic L2$s$ for the second velocity mode than in the second engine output characteristic L2$n$ for the normal mode. In other words, an upper limit N2s of the engine rotation speed in the second engine output characteristic L2s for the second velocity mode is larger than the upper limit N2n of the engine rotation speed in the second engine output characteristic L2n for the normal mode. Therefore, better acceleration performance is obtained in the second velocity mode than in the normal mode.

It should be noted that the upper limit N2n of the engine rotation speed in the second engine output characteristic L2n for the normal mode is smaller than the upper limit N1n of the engine rotation speed in the first engine output characteristic L1n for the normal mode. The upper limit N2e of the engine rotation speed in the second engine output characteristic L2e for the first velocity mode is smaller than the upper limit N1e of the engine rotation speed in the first engine output characteristic L1e for the first velocity mode. The upper limit N2s of the engine rotation speed in the second engine output characteristic L2s for the second velocity mode is smaller than the upper limit N1s of the engine rotation speed in the first engine output characteristic L1s for the second velocity mode.

The upper limit N2s of the engine rotation speed in the second engine output characteristic L2s for the second velocity mode is smaller than the upper limit N1n of the engine rotation speed in the first engine output characteristic L1n for the normal mode. The upper limit N2s of the engine rotation speed in the second engine output characteristic L2s for the second velocity mode is smaller than the upper limit N1e of the engine rotation speed in the first engine output characteristic L1e for the first velocity mode.

Figure 9:
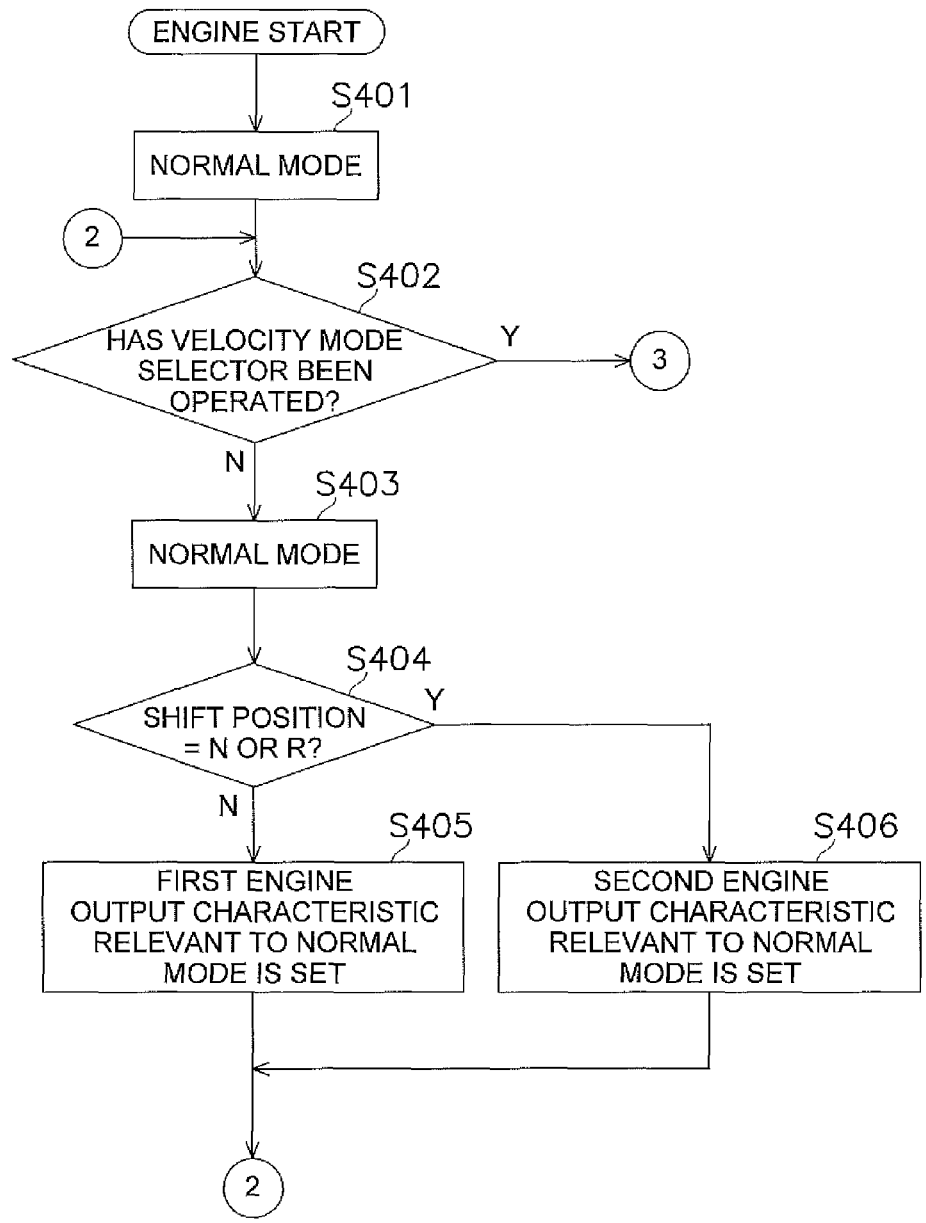
FIG. 9 is a flowchart showing a portion of process steps of a mode switch control.

FIG. 9 is a flowchart showing a portion of the process steps of the mode switch control. As shown in FIG. 9, when starting the engine 3, the normal mode is set as the control mode for the engine as shown in step S401.

In step S402, it is determined whether or not the velocity mode selector 44 has been operated. The ECU 10 determines whether or not the velocity mode selector 44 has been operated based on a signal from the velocity mode selector 44. When it is not determined that the velocity mode selector 44 has been operated, the normal mode is maintained as the control mode in step S403.

In step S404, it is determined whether or not the shift position is either of the neutral position and the backward moving position. The ECU 10 determines whether or not the shift position is either of the neutral position and the backward moving position based on a signal from the GCU 11. Alternatively, the ECU 10 may be configured or programmed to determine whether or not the shift position is either of the neutral position and the backward moving position based on a detection signal from the sensor that detects the position of the reverse gate 55.

When it is not determined that the shift position is either of the neutral position and the backward moving position, i.e., when the shift position is the forward moving position, the process proceeds to step S405. In step S405, the first engine output characteristic L1n for the normal mode is set. In other words, the ECU 10 controls the engine rotation speed based on the first engine output characteristic L1n for the normal mode (see FIG. 7).

When it is determined in step S404 that the shift position is either of the neutral position and the backward moving position, the process proceeds to step S406. In step S406, the second engine output characteristic L2n for the normal mode is set. In other words, the ECU 10 controls the engine rotation speed based on the second engine output characteristic L2n for the normal mode (see FIG. 8).

Figure 10:
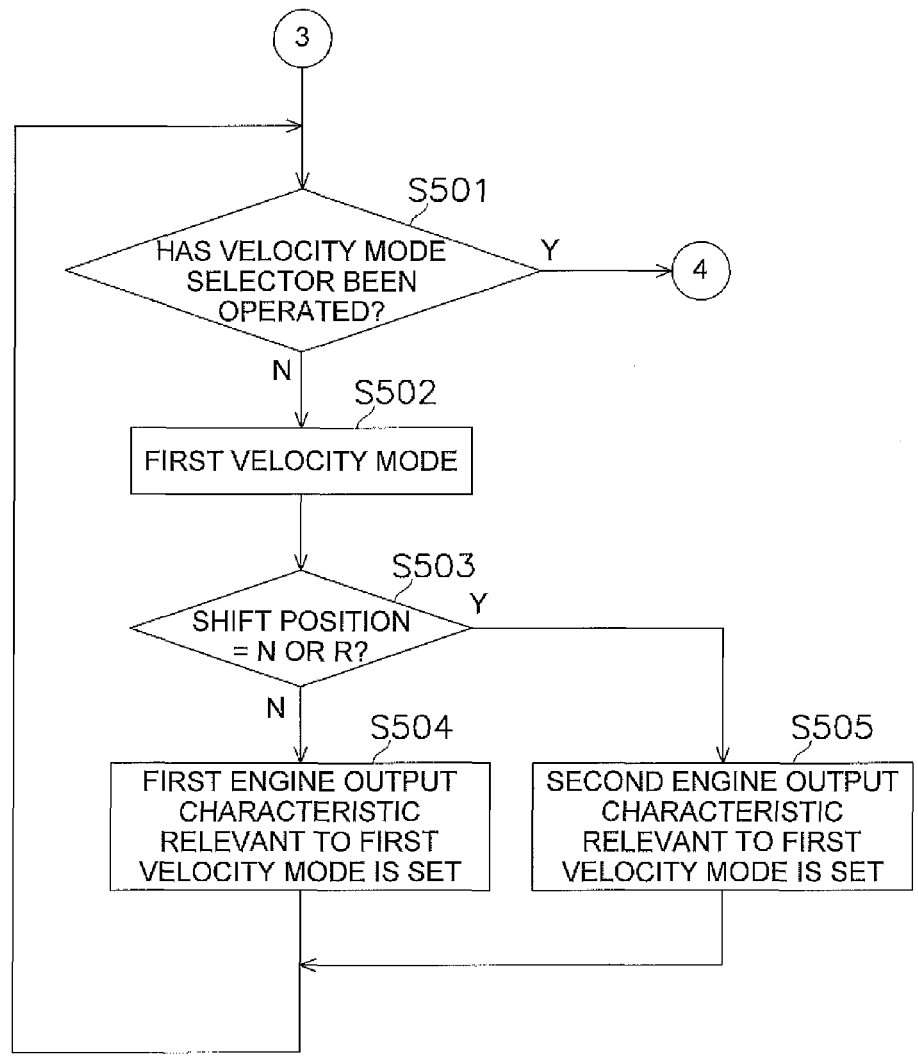
FIG. 10 is a flowchart showing a portion of the process steps of the mode switch control.

When it is determined in step S402 that the velocity mode selector 44 has been operated, the process proceeds to step S501 shown in FIG. 10. In step S501, similarly to step S402, it is determined whether or not the velocity mode selector 44 has been operated. When it is not determined that the velocity mode selector 44 has been operated, the process proceeds to step S502 and the control mode is switched to the first velocity mode.

Next, in step S503, similarly to step S404, it is determined whether or not the shift position is either of the neutral position and the backward moving position. When it is not determined that the shift position is either of the neutral position and the backward moving position, i.e., when the shift position is the forward moving position, the process proceeds to step S504. In step S504, the first engine output characteristic L1e for the first velocity mode is set. In other words, the ECU 10 controls the engine rotation speed based on the first engine output characteristic L1e for the first velocity mode (see FIG. 7).

When it is determined in step S503 that the shift position is either of the neutral position and the backward moving position, the process proceeds to step S505. In step S505, the second engine output characteristic L2e for the first velocity mode is set. In other words, the ECU 10 controls the engine rotation speed based on the second engine output characteristic L2e for the first velocity mode (see FIG. 8).

Figure 11:
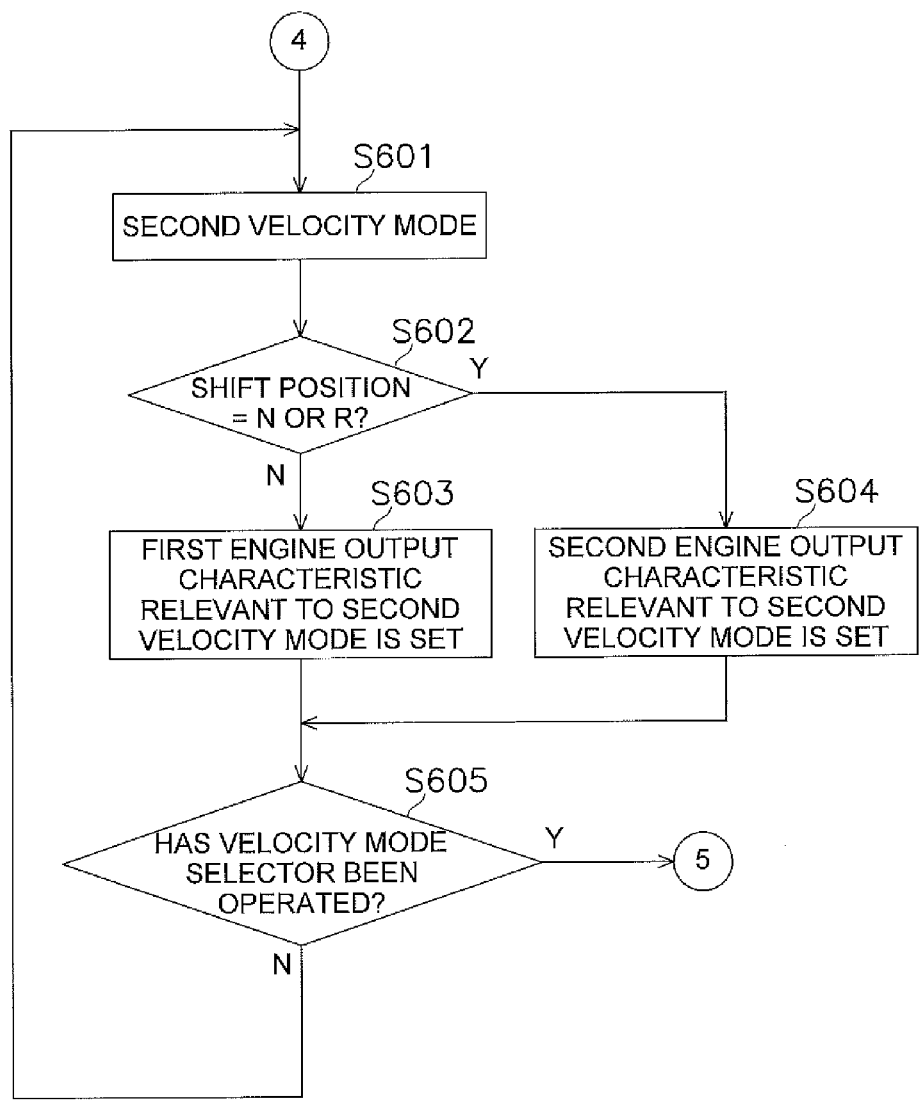
FIG. 11 is a flowchart showing a portion of the process steps of the mode switch control.

When it is determined in step S501 that the velocity mode selector 44 has been operated, the process proceeds to step S601 shown in FIG. 11. In step S601, the control mode is switched into the second velocity mode.

Next, in step S602, similarly to steps S404 and S503, it is determined whether or not the shift position is either of the neutral position and the backward moving position. When it is not determined that the shift position is either of the neutral position and the backward moving position, i.e., when it is determined that the shift position is the forward moving position, the process proceeds to step S603. In step S603, the first engine output characteristic L1s for the second velocity mode is set. In other words, the ECU 10 controls the engine rotation speed based on the first engine output characteristic L1s for the second velocity mode (see FIG. 7).

When it is determined in step S602 that the shift position is either of the neutral position and the backward moving position, the process proceeds to step S604. In step S604, the second engine output characteristic L2s for the second velocity mode is set. In other words, the ECU 10 controls the engine rotation speed based on the second engine output characteristic L2s for the second velocity mode (see FIG. 8).

In the jet propelled watercraft 100 according to the preferred embodiments explained above, when the reverse gate 55 is located in either of the neutral position and the backward moving position, and simultaneously, either of the first velocity mode and the second velocity mode is selected, the upper limit of the engine rotation speed is set to be different from that in the normal mode. Therefore, the vessel operator is able to easily regulate either deceleration of the vessel body or the thrust during backward movement by operating the velocity mode selector 44 to switch the control mode during either deceleration or backward movement.

For example, when the rear portion of the vessel body 2 deeply sinks into the water during backward movement because of a too high engine rotation speed, it is preferable to select the first velocity mode. With this selection, an increase in engine rotation speed with respect to the second accelerator operating amount is prevented. Accordingly, sinking of the rear portion of the vessel body 2 into the water is prevented as much as possible.

Alternatively, when the jet propelled watercraft 100 loaded onto a carrier is launched into the water, the jet propelled watercraft 100 is submerged into the water together with the carrier and is then moved backward. Accordingly, the jet propelled watercraft 100 is unloaded from the carrier. In this situation, it is preferable to select the second velocity mode. With this selection, the engine rotation speed is largely increased, such that the jet propelled watercraft 100 is easily launched from the carrier into the water.

Preferred embodiments of the present invention have been explained above. However, the present invention is not limited to the above-described preferred embodiments, and a variety of changes can be made without departing from the scope of the present invention.

In the above-described preferred embodiments, the PWC was an example of a jet propelled watercraft. However, the present invention may be applied to another type of jet propelled watercraft such as a jet boat.

In the above-described preferred embodiments, the approximate engine rotation speed was preferably used instead of the vessel velocity in the decision steps S104 and S202. However, the vessel velocity may be used instead. The vessel velocity may be calculated based on the engine rotation speed, or alternatively, may be detected by a GPS or a sensor (e.g., a pitot tube). Yet alternatively, as described above, a value obtained by filtering the engine rotation speed may be used as the vessel velocity.

In the above-described preferred embodiments, the backward moving position and the neutral position of the reverse gate 55 are both preferably used to decelerate the vessel body 2. However, only either of the backward moving position and the neutral position may be used.

When located in the neutral position, the reverse gate 55 may change the direction of the stream of water ejected from the jet propulsion mechanism 5 not only to the starboard and port sides of the vessel body 2 but also to the forward or down side of the vessel body 2.

In the above-described preferred embodiments, the jet propelled watercraft 100 is provided with the ECU 10 and the GCU 11. However, the jet propelled watercraft 100 may be provided with an integrated controller having both the functions of the ECU and the GCU.

The first engine output characteristics L1$n$, L1$e$, and L1$s$ for the above-described modes, respectively, are not limited to those of the above-described preferred embodiments and may be changed. Likewise, the second engine output characteristics L2$n$, L2$e$, and L2$s$ for the above-described modes, respectively, are not limited to those of the above-described preferred embodiments and may be changed.

In the above-described preferred embodiments, the low fuel consumption mode and the rapid acceleration mode are exemplified as velocity modes. However, only either of them may be used as a velocity mode. Alternatively, in addition to or instead of these control modes, another velocity mode may be used. For example, a velocity mode that automatically maintains the engine rotation speed at the time of setting may be used. Alternatively, a velocity mode that automatically reproduces a preliminarily set cruising condition may be used. The cruising condition is, for instance, the acceleration of the vessel body, the vessel velocity, or so forth.

In the above-described preferred embodiments, the first velocity mode and the second velocity mode are set for both conditions that the reverse gate 55 is located in the forward moving position and that the reverse gate 55 is located in either of the neutral position and the backward moving position. However, different velocity modes may be set for the conditions that the reverse gate 55 is located in the forward moving position and that the reverse gate 55 is located in either of the neutral position and the backward moving position. For example, a velocity mode may be used that is selectable only when the reverse gate 55 is located in the forward moving position. Additionally or alternatively, a velocity mode may be used that is selectable only when the reverse gate 55 is located in the neutral position. Yet additionally or alternatively, a velocity mode may be used that is selectable only when the reverse gate 55 is located in the backward moving position.

In the above-described preferred embodiments, the lever was an example of the first accelerator. However, a member other than the lever may be used as the first accelerator. For example, a pedal, a grip, a switch or so forth may be used as the first accelerator. In the above-described preferred embodiments, the lever was an example of the second accelerator. However, a member other than the lever may be used as the second accelerator. For example, a pedal, a grip, a switch or so forth may be used as the second accelerator.

Instead of the second accelerator, a shift operator that changes the position of the reverse gate 55 may be provided. The shift operator is, for instance, a shift lever, a shift switch or so forth. The shift operator may be coupled to the reverse gate 55 by a linkage (e.g., a wire). Alternatively, the shift operator may be electrically connected to the shift actuator 45. When the shift actuator 45 is driven by operating the shift operator, the position of the reverse gate 55 may be changed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A jet propelled watercraft comprising:
   a vessel body;
   an engine accommodated in the vessel body;
   a jet propulsion mechanism that generates a thrust due to a driving force from the engine;
   a reverse gate that moves to a first position and to a second position, the reverse gate causing the vessel body to move forward when in the first position, and the reverse gate causing the vessel body to decelerate or move backward when in the second position;
   a velocity mode selector that selects a normal mode or a velocity mode, the velocity mode being set to have a maximum velocity different from a maximum velocity of the normal mode; and
   a controller configured or programmed to set an upper limit of an engine rotation speed in the velocity mode to be different from an upper limit of the engine rotation speed in the normal mode when the reverse gate is in the second position and the velocity mode is selected.
2. The jet propelled watercraft according to claim 1, wherein the velocity mode includes a low fuel consumption mode.
3. The jet propelled watercraft according to claim 2, wherein an upper limit of the engine rotation speed is smaller in the low fuel consumption mode than in the normal mode when the vessel body is moving backward.

4. The jet propelled watercraft according to claim 1, wherein the velocity mode includes a rapid acceleration mode.

5. The jet propelled watercraft according to claim 4, wherein an upper limit of the engine rotation speed is larger in the rapid acceleration mode than in the normal mode when the vessel body is moving backward.

6. The jet propelled watercraft according to claim 1, further comprising:
   a first accelerator that moves the vessel body forward; and
   a second accelerator that moves the vessel body backward; wherein
   the controller is configured or programmed to control the engine rotation speed based on an operating amount of the first accelerator, an operating amount of the second accelerator, and a mode selected by the velocity mode selector.

7. The jet propelled watercraft according to claim 6, wherein the controller is configured or programmed to control a position of the reverse gate and a throttle opening degree of the engine based on a difference between the operating amount of the first accelerator and the operating amount of the second accelerator.

8. The jet propelled watercraft according to claim 1, further comprising:
   an accelerator; and
   a shift operator that moves the reverse gate to the first position or to the second position; wherein
   the controller is configured or programmed to control the engine rotation speed based on an operating amount of the accelerator and a mode selected by the velocity mode selector.

9. The jet propelled watercraft according to claim 1, wherein the controller is configured or programmed to control the engine rotation speed based on at least one of a throttle opening degree, a fuel injection amount, and an ignition timing.

10. The jet propelled watercraft according to claim 1, wherein, when the reverse gate is in the first position and the velocity mode is selected, the controller is configured or programmed to set an upper limit of the engine rotation speed in the velocity mode to be different from an upper limit of the engine rotation speed in the normal mode.

\* \* \* \* \*